INVENTOR.
WILLIAM S. OSTRANDER.
BY Robert F. Ruemeli
ATTORNEY.

United States Patent Office 3,322,188
Patented May 30, 1967

3,322,188
HEATING AND COOLING APPARATUS AND METHOD
William S. Ostrander, Fayetteville, N.Y., assignor to Carrier Corporation, Syracuse, N.Y., a corporation of Delaware
Filed July 8, 1965, Ser. No. 470,404
4 Claims. (Cl. 165—2)

This invention relates to an air conditioning installation and method of air conditioning and, more particularly, to a heating and cooling system having a refrigeration machine for providing cooling and rejecting the heat involved therein, and another refrigeration machine for reclaiming the rejected heat and passing the heat to a load having a heating requirement.

A problem with many heating and cooling systems is the utilization of excessive power for operating the system. For example, during normal operation of such a system, both heating and cooling are required for adequately air conditioning a building. Considering the heat imparted to a building by people and machines in the building, at 25° F. outside or ambient temperature the heating and cooling requirements may be equal so that it is merely necessary to pass heat from warmer areas to cooler areas, but at 95° F. outside temperature possibly no heating is required and only cooling is necessary. Between these extremes, the proportion of heating and cooling required to satisfy a typical building load will vary and, for economic reasons, it is highly desirable that the air conditioning requirements be satisfied at a minimum power output.

It is a primary object of this invention to provide a new and improved heating and cooling system and, more particularly, to provide such a system which is economical in operation.

Another object is to provide a new and improved heating and cooling system having a first refrigerating machine for cooling a load and rejecting the heat evolved therein, and a second refrigerating machine for reclaiming the heat rejected by the first refrigerating machine only to the extent required to satisfy a load having a heat requirement at a higher temperature level than is available in the condenser of the first machine. A related object is provision for operating the second refrigerating machine only when the heating load requires heat.

Figure 1:
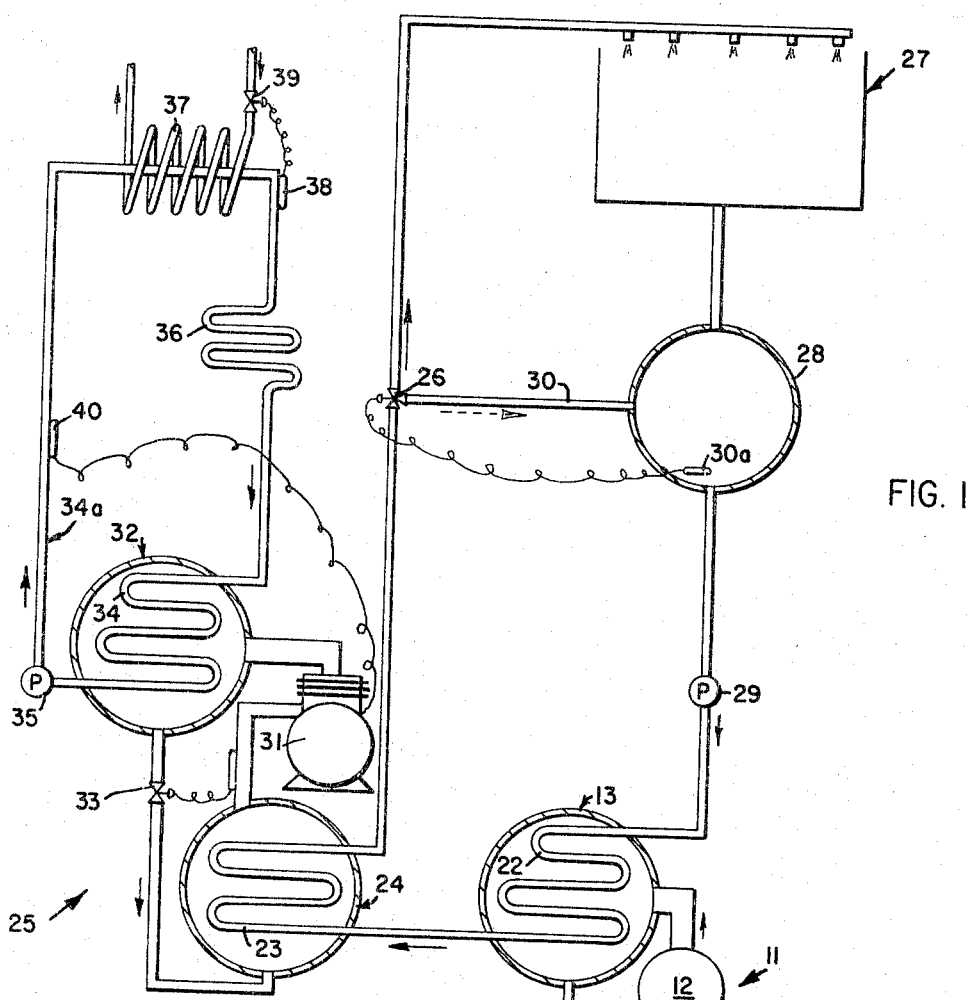
Figure 2:
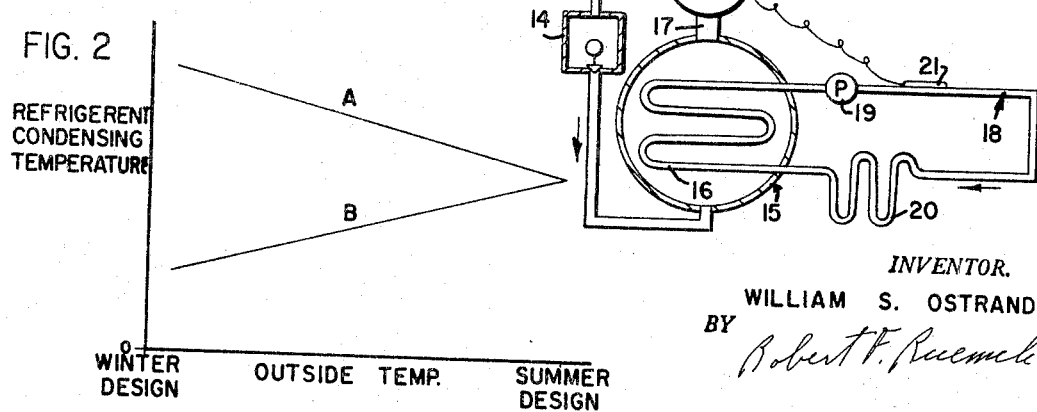

These and other objects of the invention will be apparent from a cosideration of the following description and drawing in which:

FIGURE 1 is a schematic diagram of a heating and cooling apparatus illustrating the invention; and FIGURE 2 is a graph representing a comparison of the performance of the heating and cooling apparatus forming this invention and of previously known apparatus for performing a similar function.

Referring to the drawing, a heating and cooling system is illustrated and incorporates a pair of refrigerating machines. A first of the machines 11 includes a compressor 12 such as a centrifugal compressor for passing refrigerant vapor to a condenser 13 from which refrigerant condensate passes through a suitable flow metering device such as a float valve unit 14 and to an evaporator 15 where it vaporizes as heat is extracted from water in a chilled water bundle 16. The vapor is withdrawn through a suction line 17 to the compressor 12. The chilled water bundle 16 is part of a chilled water line 18 and is in circuit with a pump 19 for passing the chilled water to a load having a cooling requirement and illustrated as a coil 20. Cooling operation is regulated in any suitable manner as by a temperature sensor 21 on the leaving branch of the chilled water line 18 for controlling the capacity of compressor 12.

A condensing water bundle 22 in the condenser 13 of the first machine is connected in circuit with a second chilled water bundle 23 in an evaporator 24 of a second refrigerating machine 25 from which the condensing water passes through a modulating three-way valve 26 to a cooling tower 27 and then to a sump or accumulator tank 28 and through a condensing water pump 29 back to the condensing bundle 22 of the first machine 11. In order to maintain a desired minimum condensing water temperature in the accumulator 28, for example 65° F., a bypass line 30 is provided from the modulating three-way valve 26 into the accumulator tank 28 so that when the tank temperature deviates sufficiently from normal, as sensed by a sensor 30a in the tank, the valve 26 may be positioned to pass either all or a part of the flow through bypass 30 directly into the accumulator tank.

The second refrigeration machine 25 includes the second evaporator 24 connected in circuit with a second compressor 31, such as a reciprocating compressor for withdrawing refrigerant vapor from the evaporator and passing compressed vapor to a second condenser 32 from which the refrigerant condensate returns through a suitable expansion valve 33 to the evaporator 24. A condensing coil 34 in the second condenser 32 is part of a heating line 34a and is connected in circuit through a heating water pump 35 with a load having a heating requirement, illustrated in the form of a coil 36, from which cooled heating water returns to the condensing bundle 34 in the second condenser 32.

The operation of the heating and cooling system is as follows. The first refrigeration machine 11 operates whenever a cooling load exists and rejects the heat resulting from this cooling operation to its condensing water circuit by means of condenser tube bundle 22. This condensing water circuit carries the rejected heat first to the evaporator bundle 23 of the second refrigeration machine 25, where the correct amount of heat to satisfy the heating requirement is absorbed, and then to the control valve 26, which directs the necessary amount of condensing water to the accumulator sump 28 or to cooling tower 27 to reject the excess heat which is not required to satisfy the heating requirement and must be rejected to the atmosphere.

Should insufficient heat to satisfy the heating load 36 be available from the cooling load 20 plus the heat of compression of both compressor 12 and compressor 31, a suitable auxiliary heater 37 is provided for heating the condensing or heating water to the heating load 36 and is controlled as by a suitable sensor 38 on the heating line 34a, for operating a modulating control valve 39 in the event the auxiliary heater 37 utilizes steam or hot water. This supplementary heating could also be done by electricity. The second compressor 31 is preferably controlled by a similar sensor 40 on the heating line 34a upstream of the auxiliary heater 37.

A substantial advantage of the invention is that the second refrigerating machine 25 which provides heating for the heating load 36, need be operated only if heat is required by a heating load, and then the power input need be only that required to provide sufficient heat to satisfy this load. In the event that no heat is required, all of the condensing water from the first refrigerating machine 11 which provides cooling for the cooling load 20, is rejected through the cooling tower 27. Additionally, the second refrigerating machine 25 may be provided with a relatively low pressure refrigerant so that sufficiently high heating water temperature, that is the temperature of the condensing water from the second condenser 32, may be obtained at relatively low pressures throughout the second machine 25, thus reducing the structural strength required in the second refrigerating machine.

In known refrigeration machinery for satisfying simultaneous heating and cooling requirements as well as a heating requirement solely or a cooling requirement solely, the condensing of refrigerant is accomplished by a first cooling circuit including the heating requirement and a second circuit including a cooling tower or similar heat sink. A variation in the heating requirement involves variation in the amount of heat rejected in the cooling tower. In any event, to satisfy the heating requirements, the temperature (pressure) at which refrigerant is condensed is usually increased as the outside ambient temperature decreases, by means of automatic control devices such as an outside air master thermostat operating in conjunction with and to reset the control point of a sub-master hot water control thermostat. All heat, including that to be wasted in a cooling tower or other rejection device, must be rejected at a high temperature shown as curve A, FIGURE 2, resulting in unnecessary power consumption.

The arrangement forming this invention rejects the excess heat at a relatively low pressure level so that only the heat, as represented by the high pressure gaseous refrigerant, necessary to satisfy the heating requirement is pumped to the relatively high pressure level necessary to satisfy the heating requirement. The waste heat can be rejected at lower condensing temperatures (pressures) when the outside air temperature is less than summer maximum design condition due to the increased heat rejection capability of the cooling tower under these cooler atmospheric operating conditions, as indicated by curve B, FIGURE 2. A considerable savings in operating cost will ensue, due to the reduced temperature levels to which the waste heat must be compressed.

It should also be noted that when the system must satisfy a relatively large heating demand and a relatively small cooling demand, the refrigerant condensing temperature of the centrifugal machine 11 may be substantially lower than if the centrifugal machine were required to operate at a condensing temperature sufficient to satisfy the heating demand. By providing such lower refrigerant condensing temperature of the centrifugal machine at relatively small cooling capacity, the tendency of the centrifugal compressor to surge, or operate in an unstable condition, is substantially reduced.

While a preferred embodiment of the invention has been described and illustrated, it should be understood that the invention is not limited thereto but may be otherwise embodied within the scope of the following claims.

I claim:

1. A method of operating a heating and cooling system including first and second refrigerating machines, comprising operating the first refrigerating machine for cooling a load and rejecting the heat evolved therein to condensing water, passing said condensing water to the second refrigerating machine, operating the second refrigerating machine for transferring to refrigerant circulated therethrough sufficient heat from said condensing water for heating a load, increasing the temperature of said refrigerant above the temperature of said condensing water, and transferring heat from said refrigerant to other water, and passing the last said water to the load to be heated, thereby heating the load with the reclaimed heat from said first refrigerating machine.

2. In a heating and cooling system, the combination of a first refrigeration machine for cooling a load, said machine including a centrifugal compressor, a condenser, regulating means, and a cooler placed in a closed circuit in such order, means for placing a medium to be cooled in heat exchange relation with refrigerant in said cooler, means for passing the cooled medium from the cooler in heat exchange relation with a load to be cooled and for returning the medium after such passage to be cooled in the cooler; means for circulating condensing water through said condenser thereby heating the condensing water; a second refrigeration machine for heating a load, said machine including a reciprocating compressor, a second condenser, regulating means, and an evaporator placed in a closed circuit in such order, means for passing condensing water from said first condenser to said evaporator, heat from said condensing water being transferred to a second refrigerant in said evaporator, said compressor imparting additional heat to said refrigerant while forwarding the refrigerant to said second condenser; means for placing other condensing water to be heated in heat exchange relation with refrigerant in said second condenser, means for passing the heated other condensing water from the second condenser in heat exchange relation with a load to be heated and for returning the other condensing water after such passage to the second condenser to be heated; means for removing heat in said condensing water after its passage through the evaporator of the second refrigeration machine in excess of the heat required for heating the load, and means for supplying the condensing water from said last named means to the first condenser of the first refrigeration machine.

3. A system according to claim 2 in which said last named means comprises a cooling tower.

4. A system according to claim 2 in which means are provided for operating the second refrigeration machine only when the heating load requires heat.

References Cited
UNITED STATES PATENTS

| | | | |
|---|---|---|---|
| 2,982,523 | 5/1961 | McFarlan | 165—62 |
| 3,067,587 | 12/1962 | McFarlan | 62—159 |
| 3,234,749 | 2/1966 | Quick | 62—510 X |
| 3,267,689 | 8/1966 | Liebert | 62—277 |

ROBERT A. O'LEARY, *Primary Examiner.*

MEYER PERLIN, *Examiner.*

W. E. WAYNER, *Assistant Examiner.*